(12) United States Patent
Greene (10) Patent No.: US 6,870,929 B1
(45) Date of Patent: Mar. 22, 2005

(54) HIGH THROUGHPUT SYSTEM FOR ENCRYPTION AND OTHER DATA OPERATIONS

(75) Inventor: Spencer Greene, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 09/470,565

(22) Filed: Dec. 22, 1999

(51) Int. Cl.[7] .......................... H04K 1/00; H04L 9/00; G06F 7/38
(52) U.S. Cl. ........................ 380/28; 380/30; 380/37; 380/42; 708/233; 708/234
(58) Field of Search .................. 713/174, 192, 713/502; 380/37, 29, 265, 42, 30; 708/3, 135, 200, 234, 233, 406, 521, 524; 710/52; 712/17, 9, 13, 36

(56) References Cited

U.S. PATENT DOCUMENTS

| | | | | |
|---|---|---|---|---|
| 4,731,843 A | * | 3/1988 | Holmquist | 380/29 |
| 5,251,306 A | * | 10/1993 | Tran | 712/217 |
| 5,680,482 A | * | 10/1997 | Liu et al. | 382/233 |
| 5,768,257 A | * | 6/1998 | Khacherian et al. | 370/229 |
| 5,799,089 A | * | 8/1998 | Kuhn et al. | 380/37 |
| 6,088,800 A | * | 7/2000 | Jones et al. | 713/189 |
| 6,347,143 B1 | * | 2/2002 | Goff et al. | 380/37 |
| 6,510,474 B1 | * | 1/2003 | Stracovsky et al. | 710/58 |

OTHER PUBLICATIONS

IBM Technical Disclosure Bulletin, Jan. 1995, vol. 38. No. 01.*
Eberle, Hans. "A High–speed DES Implementation for Network Applications", Sep. 23, 1992, pp 6–10.*
Eberle, Hans and Charles P. Thacker. "A 1 GBit/Second GAAS DES Chip", 1992, IEEE 1992 Custom Integrated Circuits Conference.*
Hennessey J. L. and D. Patterson, Computer Architecture: A Quantitative Approach. Morgan Kaufmann Publishers.*
"VMS115 Data Sheet," VLSI Technology, Aug. 10, 1999.
"Hi/fn 7811 Data Sheet," HI/Fn, Inc., 1997–1999.
"Data Encryption Standard," *FIPS PUB 46–3*, U.S. Department of Commerce, Oct. 25, 1999.

* cited by examiner

Primary Examiner—Gregory Morse
Assistant Examiner—Michael J. Simitoski
(74) Attorney, Agent, or Firm—Harrity & Snyder LLP (57) ABSTRACT

According to one embodiment, an encryption system (500) includes an input buffer (504) that can provide data blocks from different contexts (522-1 to 522-n) to a selected encryption circuit (524-1 to 524-m) according to a scheduling section (502). A scheduling section (502) can include a register array (510) having rows that each correspond to a context and columns that correspond to an encryption circuit. Each register array (510) row can store one "hot" bit that designates a context with a particular encryption circuit. A column can be selected by a multiplexer (514) and its values prioritized and encoded by a priority encoder (518) to generate an address that results in the selection of a data block from a particular context. Priority may be varied by shifting a column value with a rotate circuit (516) according to an offset value (OFFSET).

22 Claims, 5 Drawing Sheets

HIGH THROUGHPUT SYSTEM FOR ENCRYPTION AND OTHER DATA OPERATIONS

TECHNICAL FIELD

The present invention relates generally to data processing systems, and more particularly to a data encryption system.

BACKGROUND OF THE INVENTION

Data encryption systems can be used to ensure the security and/or authenticity of a data message. In security applications, a data encryption system can transform a message into an ideally undecipherable form. Once transformed, the message can be transmitted over an insecure medium without fear that it may be intercepted and understood. In authentication applications, all or a portion of a message can be encrypted using secret key information. If the message is altered or corrupted in transit, or a third party attempts to impersonate the sender, the receiver can detect this fact using a decryption operation.

As computer networks continue to proliferate, concerns about security and authenticity of network data grow correspondingly. Many networks can include links that are not secure, or that could be accessed by third parties with relative ease. It is therefore desirable to encrypt sensitive data before and/or as it is being transmitted across a network.

The many applications where data encryption can be desirable include virtual private networks (VPN), secure electronic mail, banking systems that include electronic funds transfer (EFT), and various "real-time" applications such as voice and/or video over a network, where sensitive data is transmitted. Such applications can have two, potentially conflicting goals: security of transmission and speed of transmission. Because encryption is computationally intensive, it is difficult and expensive to build systems that encrypt and decrypt data at very high speed. For a networking system in particular, it is desirable to process packets as they arrive (at "wirespeed"), and with higher and higher bandwidth links becoming common, wirespeed encryption processing is becoming increasingly challenging.

Figure 6:
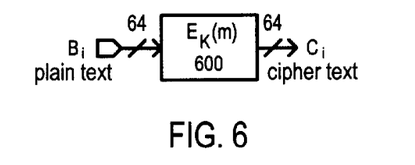
FIG. 6 is a block diagram of a conventional encryption circuit.

An example of a basic encryption system is set forth in FIG. 6. The encryption system includes an encryption circuit 600. The encryption circuit 600 can receive in each processing time period one 64-bit block of "plaintext" ($B_i$) and transform it into a corresponding 64-bit block of "ciphertext" ($C_i$). The index i increases in time as subsequent blocks of plaintext are fed into the system, so that in the first processing period $B_1$ is transformed to corresponding $C_1$, in the next period $B_2$ is transformed to $C_2$, etc. In the arrangement of FIG. 6, a plain text block can be encrypted according to a key (K). A key can be subsequently used to decrypt the ciphertext back into its original plaintext form. In a symmetric encryption system, the same key is used to encrypt a message is used to decrypt the message. In an asymmetric encryption system, the key used to encrypt a message is different from that used to decrypt the message.

An encryption circuit 600 can include an algorithm executed by a general or special purpose processor, a dedicated circuit, or some combination thereof.

Figure 7:
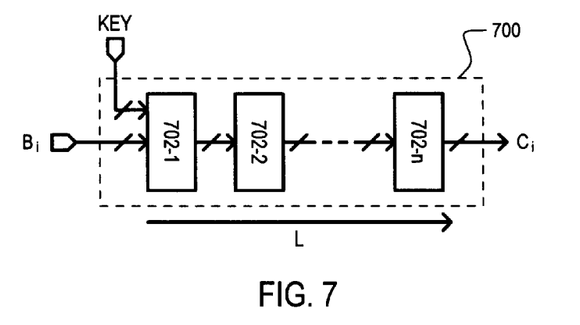
FIG. 7 is a block diagram of another conventional pipelined encryption circuit.

FIG. 7 illustrates an example of an encryption circuit. The encryption circuit is designated by the general reference character 700, and is shown to include a series of cipher stages 702-1 to 702-n. Each cipher stage (702-1 to 702-n) performs one portion of an encryption function.

In the arrangement of FIG. 7, the delay introduced by the encryption circuit 700 is the latency L introduced by the signal propagation delay of the circuit.

Figure 8:
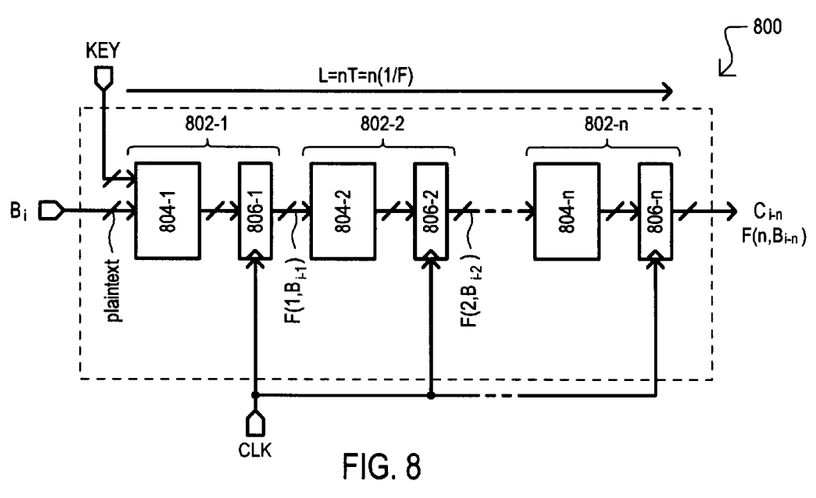
FIG. 8 is a block diagram of a conventional pipelined encryption circuit.

FIG. 8 illustrates an example of a pipelined encryption circuit. The pipelined encryption circuit is designated by the general reference character 800, and includes a series of clocked cipher stages 802-1 to 802-n. Each clocked cipher stage (802-1 to 802-n) performs one portion of an encryption function, but passes its results into a subsequent stage according to a clock signal CLK. Consequently, each clocked cipher stage (802-1 to 802-n) can be conceptualized as including a combinational section (804-1 to 804-n) and a pipeline register (806-1 to 806-n).

We will use the notation f(m,x) to represent the output of stage 802-m when the 64-bit value x is input to that stage. Then, in the diagram stage 802-1 receives as input $B_i$ and generates the output f(1, $B_i$). Stage 802-2 receives as input f(1, $B_i$) and generates the output f(2, f(1, $B_i$)). Similarly, each stage receives the output of the previous stage as its input. Thus, the output of the entire chain is f(n, f(n−1, f(n−2, ... f(2, f(1, $B_i$)) ... ))).

We define the further notation F(m, x) to be the output of the chain of stages 802-1 through 802-m, given the 64-bit value x input to the first stage. Thus, in the figure the output of stage 802-1 would be F(1, $B_i$), the output of stage 802-2 would be F(2, $B_i$), and so on, so that the output of stage 802-n would be F(n, $B_i$), which should correspond to the desired ciphertext $C_i$.

FIG. 8 illustrates how the cryptographic computation can be pipelined. Thus, pipelined cipher section 802-2 is shown to provide an output value F(2, $B_{i-2}$), at the same instant that pipelined cipher section 802-1 receives an input value $B_i$.

In the arrangement of FIG. 8, the delay introduced by the encryption circuit 800 is the latency L, where L=(n)T=n(1/F). Here n is the number of clocked staged in the encryption circuit 800, and T and F are the period and frequency of the CLK signal, respectively. An advantage of the arrangement of FIG. 8 is that while the encryption of a particular plain text block involves a latency L, one block can be encrypted each clock cycle, in a pipelined fashion.

While a pipelined encrypting arrangement can provide a high throughput, such an arrangement may not be conducive to particular commonly used encryption modes. For example, many popular encryption modes combine a previously encrypted ciphertext block (or value) with a newly arriving plaintext block. In particular, one type of encryption is "DES," described in DES: Data Encryption Standard, FIPS PUB 46, National Bureau of Standards in 1977. DES describes a cyclic block chaining (CBC) mode in which a completed ciphertext block is exclusive-ORed (XORed) with a subsequent plaintext block in a data block series. DES also includes non-feedback modes. In an electronic code-book (ECB) mode, plaintext input blocks can be pipelined in serial fashion, without a feedback step.

Figure 9:
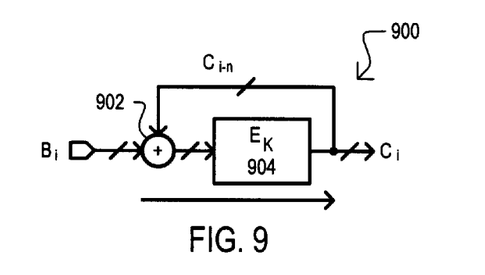
FIG. 9 is a block diagram of a conventional CBC mode DES circuit.

An example of a CBC mode DES circuit is shown in FIG. 9. The circuit is designated by the general reference character 900 and is shown to receive a plaintext block ($B_i$). Block $B_i$ is XORed, at XOR gate 902, with previously encrypted ciphertext block ($C_{i-1}$). This result will then be encrypted by encryption circuit 904 to form ciphertext block $C_i$, which is an output of the system, and which is also "fed back" as an input to the XOR gate 902 with plaintext block $B_{i+1}$, etc.

The encryption circuit of FIG. 9 has a latency shown as L. Thus, if a sequence of plaintext blocks is applied, the blocks must be spaced from one another by at least the latency L, since a new block cannot be processed by encryption circuit 904 until the ciphertext from the previous block has been fully computed. In a 3DES mode, a single block of plaintext data may be passed through encryption circuit 904 three times, before the ciphertext is available and the next plaintext block can be started.

In one particular arrangement, an encryption circuit 904 can include a number of DES rounds and provide a DES and/or 3DES type of encryption or decryption.

Figure 10:
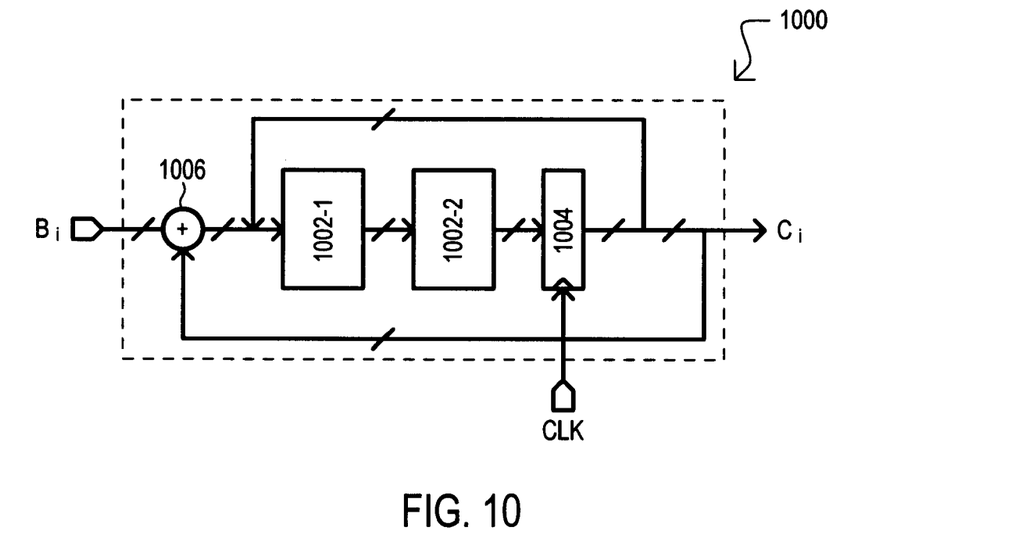
FIG. 10 is a block diagram of a conventional encryption circuit having a reduced number of stages.

FIG. 10 sets forth an example of another encryption circuit that can include fewer cipher stages. The encryption circuit 1000 includes two cipher stages 1002-1 and 1002-2. Data can be processed through the cipher stages (1002-1 and 1002-2) multiple times to provide a desired encryption. For example, if an encryption operation required 16 cipher stages, a plain text block could be passed through cipher stages (1002-1 and 1002-2) eight times, with the output of 1002-2 passed back to the input of 1002-1. In the case of DES, the cipher stages 1002-1 and 1002-2 would use a different portion of the key K for each of the eight passes through them; a key schedule circuit, not shown, would be provided for this purpose. At the end of the eight passes through 1002-1 and 1002-2, a single ciphertext result would be obtained, and the next plaintext block could be started. The encryption circuit 1000 includes an XOR circuit 1006 for executing encryption functions that can require feeding encrypted data blocks back into newly received data blocks, such as DES and 3DES in CBC mode.

In light of the various applications for encryption circuits, only a few of which are mentioned above, there is a need for encryption systems that can process data blocks with higher throughput.

Other types of data operations can present problems which are similar in nature to encryption functions. For example, many operations can have "feedback" type steps, where a computed value is fed back into a computation stage as an operand. One particularly useful type of operation is modular exponentiation. In modular exponentiation, the computation can be reduced into a number of smaller multiplication and modular reduction steps, allowing for faster implementation on a computer or other hardware.

For example, it may be desirable to calculate the following:

$$y = (A^e) \bmod n.$$

Such a value can be reduced to a sequence of modulo n operations and multiplication operations. As just one example, the following method of calculating modular exponentiation can be implemented:

```
for (yy=1, aa=A, e!=0) {
    if(e&1) yy=(yy*aa) mod n
    aa=(aa*aa) mod n
    e=e>>1
}.
```

The step e&1 examines a particular bit of the value e. The step e=e>>1 moves to the next bit of e. The last value yy will be the desired result.

In this arrangement, the two operations yy=(yy*aa) mod n and aa=(aa*aa) mod n are computations that (apart from the first iteration) utilize the previously computed yy and aa results from the previous loop iteration. If such a computation is implemented in a pipelined circuit, and the latency of the circuit is greater than the rate at which values are applied to the circuit, each operation must "wait" until the previous result has fully propagated through the pipeline. This can result in delays and/or times at which various pipeline segments are idle.

SUMMARY OF THE INVENTION

According to one embodiment, an encryption system can include an input buffer that receives data blocks. The data blocks can be organized into a number of contexts. According to a scheduler, data blocks from different contexts can be applied to an encryption circuit having pipelined cipher stages.

According to one aspect of the embodiment, a scheduler can include a column of storage locations, each corresponding to a context. The values of a column are prioritized to designate one particular context with the encryption circuit.

According to another aspect of the embodiment, a system can include more than one encryption circuit, and a scheduler can include a storage array having rows and columns. Rows can correspond to a particular context and columns can correspond to a particular encryption circuit. Columns can be selected and the values therein prioritized to designate a context with a particular encryption circuit.

According to another aspect of the embodiment, an encryption circuit can include a feedback loop. By applying data blocks from different contexts data blocks can be processed by the encryption circuit in a pipelined fashion.

While the term "encryption" is used throughout this description, it is understood that "encryption" can include both encryption and decryption.

DETAILED DESCRIPTION OF THE EMBODIMENTS

Various embodiments of the present invention will now be described in conjunction with a number of diagrams. The various embodiments include an encryption system that can provide higher throughput than other conventional approaches. In particular embodiments, multiple data blocks can be pipelined across one or more encryption circuits. Such an arrangement can allow a new encrypted block to be generated on each operational cycle, where a cycle can be as small as one clocked cipher stage within an encryption circuit.

Figure 1:
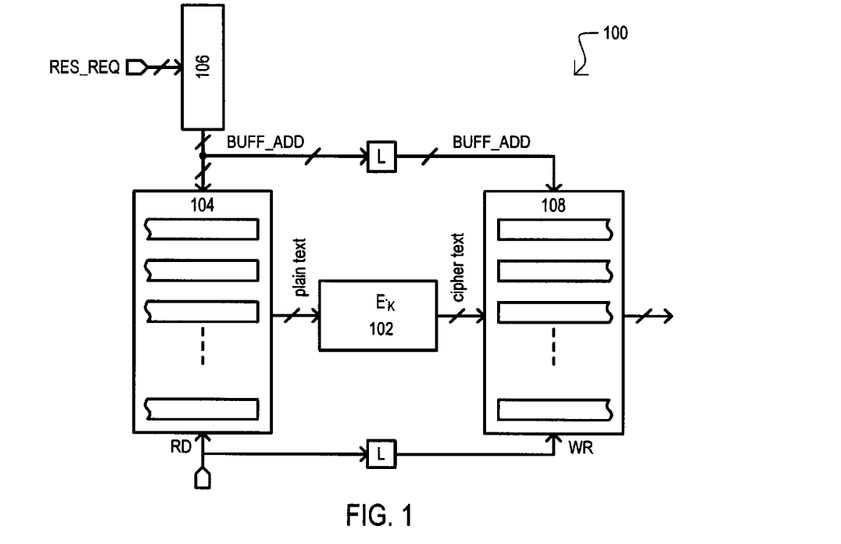
FIG. 1 is a block diagram of a first embodiment.

Referring now to FIG. 1, a block diagram is set forth illustrating a first embodiment. The first embodiment is designated by the general reference character 100, and is shown to include an encryption circuit 102, an input buffer/working store 104, an output buffer 108, and a scheduler 106. An encryption circuit 102 can include a number of cipher stages that enable pipelined operation. The encryption circuit 102 can process a given input data block with a latency L, where L=nT. The value n can be the number of cipher stages, and the value T is the clock period of the system, which will be no smaller than the delay introduced by the slowest cipher stage.

The input buffer/working store 104 can include various storage circuits that store data blocks from multiple data streams. Each data stream can include one data block, or a sequence of data blocks having a particular order. Each such data block and/or sequence of data blocks will be referred to herein as a "context." As just one example, each context can represent data from a particular network packet. An input buffer/working store 104 can be implemented in a variety of forms. As but two of the many possible examples, and input buffer can include first-in-first-out (FIFO) memory device(s) or random access memory (RAM) device(s).

The output buffer 108 can include storage circuits corresponding to those in the input buffer/working store 104. In particular, the output buffer 108 can store out-going (encrypted) blocks in the same general fashion as incoming (non-encrypted) blocks. An output buffer 108 may be constructed in the same fashion as the input buffer/working store 104, or be formed from different types of storage circuits than the input buffer/working store 104.

The scheduler 106 determines the order in which the data stored in the buffer 104 will be processed. The scheduler may take a variety of forms. In one particular embodiment, the scheduler 106 can include an array of bits, with one bit corresponding to each context. If a context has data that can be processed, its corresponding bit can have one value ("1" for example). If a context does not have data to be processed, its corresponding bit can have another value ("0" for example).

Figure 2A:
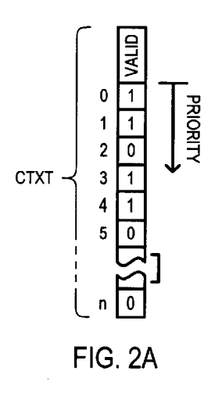
FIGS. 2A to 2C are tables illustrating the operation of a scheduler according to one embodiment.
Figure 2B:
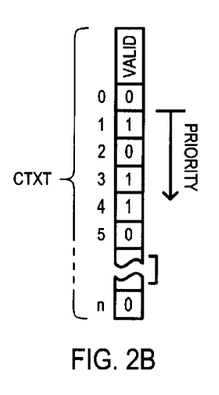
Figure 2C:
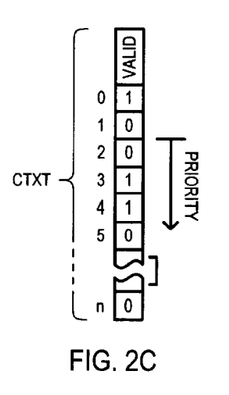

Referring now to FIGS. 2A–2C, a sample of a scheduler operation is illustrated in a series of tables. Each table includes a column identifying a particular context (CTXT) and a valid column (VALID) corresponding to each context. A particular context can be selected by prioritizing VALID bits on a rotating basis.

FIGS. 2A to 2C illustrate three consecutive system cycles, where prioritization begins with context zero. In FIG. 2A contexts 0, 1, 3 and 4 are active. Because prioritization begins with context zero, a data block can be accessed from context zero and applied to an encryption circuit.

In a subsequent cycle, as shown by FIG. 2B, because context 0 has been accessed, its corresponding valid bit is changed to zero. In addition, the priority changes on a "round robin" basis. As a result, context 1 has priority. Consequently, the data block from context 1 is applied to an encryption circuit.

In FIG. 2C, because context 1 has been accessed, its corresponding valid bit is changed to zero. In addition, the priority changes once again. Because the valid bit of context 2 is zero, it is not accessed. The next context that is valid, context 3 in the example of FIG. 2C, can provide a corresponding data block to an encryption circuit.

It is noted that priority may be established in a variety of ways within a scheduler. As one example, priority can be given to the "oldest" context request. As another example, priority may rotate by one context each system cycle. As yet another of the many possible examples, priority may rotate by more than one context by encoding any "invalid" contexts between a selected context and the next valid context, and then rotating so that the next priority begins at the next valid context.

Figure 3:
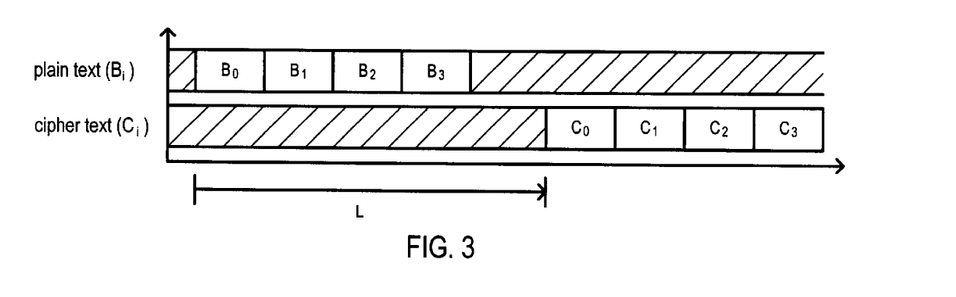
FIG. 3 is a timing diagram illustrating the operation according to the scheduling shown in FIGS. 2A and 2C.

A timing diagram illustrating an operation corresponding to that shown in FIGS. 2A to 2C is shown in FIG. 3. FIG. 3 is a timing diagram illustrating the inputs to an encryption circuit ($B_i$) and the outputs of an encryption circuit ($C_i$). The variable i indicates a particular context. As shown by FIG. 3, once an input data block is applied, it will be provided in encrypted form a latency L later (where L is determined by the encryption circuit).

Referring now to FIG. 3 in conjunction with FIG. 1, in one particular arrangement, in each cycle, the scheduler 106 can provide an address BUFF_ADD for the first buffer 104 on consecutive cycles. A corresponding buffer read signal (RD) can be activated if a valid block of data is available. A data block can then be read into encryption circuit 102.

A latency L later, an address can be applied to output buffer 108 along with a write signal (WR). The address applied to output buffer 108 can ensure that an encrypted data block is placed into an output buffer context that corresponds the input buffer context from which the original data block originated.

In the particular arrangement of FIG. 1, the address applied to the output buffer 108 can be the same address that is applied to the input buffer 106, but delayed by a latency L. Similarly, the write signal (WR) can be the read signal (RD) delayed by the latency L. Of course, one skilled in the art would recognize that alternate embodiments can generate buffer addresses, read commands and write commands according to a series of instructions executed by a special or general purpose processor.

It is noted that in the event accesses to an input buffer and/or to an output buffer take longer than the delay of longest pipeline stage (T) in encryption circuit 102, data blocks can be applied at appropriate multiples of T. That is, if a buffer access time is less than 4T but greater than 3T, data blocks can be read at periods of 4T.

Still further, in the event accesses to an input buffer and/or to an output buffer take longer than the delay of longest pipeline stage (T), a buffer can include individually accessible storage devices accessed by staggered clocks generated by a phased-lock-loop (PLL) or delay-locked-loop (DLL) circuit or the like. In this way, pipelining can occur with a period T even when accesses to a buffer are greater than T.

In this way, a scheduler can apply data blocks from different contexts in a pipelined fashion to an encryption circuit. This is in contrast to a conventional approach that may process one series of data blocks at a time. The present invention may thus more evenly distribute encryption resources over multiple data block sequences, preventing particular one sequence of data blocks from being "stuck" behind another data block sequence as it is encrypted.

An encryption circuit 102 can also be capable of "feedback"-type encryption functions, such as cipher block chaining (CBC), cipher feedback (CFB) or output feedback (OFB) modes of the data encryption algorithms such as DES and Triple DES, or any of various secure hash algorithms. In such an arrangement, consecutive blocks from a context can be applied a predetermined latency from one another, where the predetermined latency is that of the encryption circuit. For example, in a DES CBC mode, a latency can be one pass through an encryption pipeline.

Figure 4A:
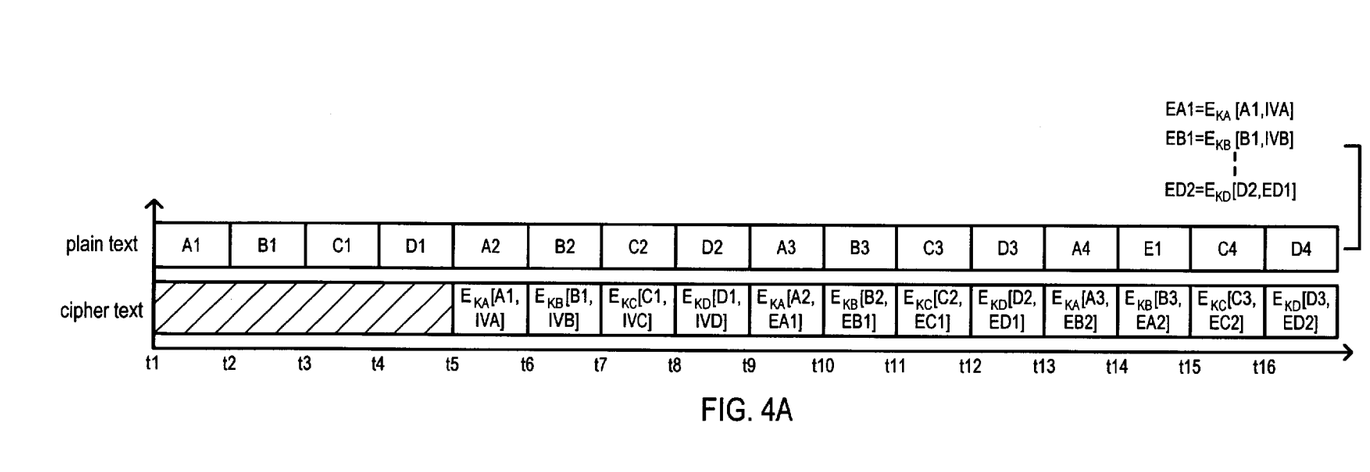
FIG. 4A is a timing diagram illustrating the operation of an embodiment.
Figure 4B:
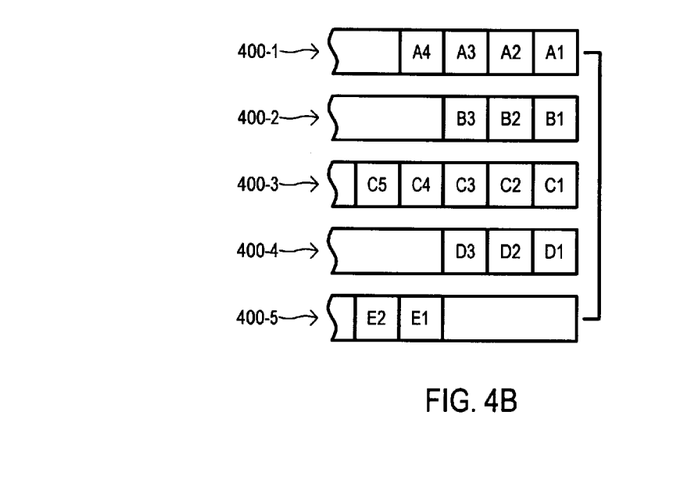
FIG. 4B is a diagram illustrating one buffer arrangement that can correspond to FIG. 4A.

Referring now to FIG. 4A, a timing diagram is set forth illustrating an encryption operation according to one embodiment where multiple contexts are encrypted with a feedback-type method in a pipelined fashion. FIG. 4B illustrates contexts that correspond to the operation of FIG. 4A.

In FIG. 4A, data blocks from different contexts are given a particular letter designation and number designation. The letter designation indicates a context of origin, the number designation indicates how many blocks have previously been processed for the context in question. Thus, a first context can provide data block A1, followed by data block A2, followed by data block A3, etc. Further, if it is assumed that CBC is employed, the encrypted form of data block A1 (designated as E[A1]) is an input that is used together with data block A2 to encrypt data block A2.

In general, each context will have its own encryption/decryption key (or, in the case of Triple-DES and similar algorithms, set of encryption/decryption keys). The keys for all active contexts are stored and retrieved at appropriate times as seen below.

In FIG. 4B, five contexts are illustrated as items 400-1 to 400-5. Five data block sequences are shown as A1 to A4, B1 to B3, C1 to C5, D1 to D3 and E2 to E2, corresponding to contexts 400-1 to 400-5, respectively. Context 400-5 includes three blank leading blocks that are "blank." This can indicate that while data blocks A1, B1, C1 and D1 are immediately available, data block E1 will not be available for another three cycles.

The example of FIGS. 4A and 4B assumes that an encryption circuit (such as 102) has a pipeline of four stages. Further, the encryption type is a CBC mode DES.

Referring now to FIG. 4A, initial priority can be determined in the same general fashion as the example described in FIGS. 2A, 2B and 3. Consequently, in the first four cycles, data blocks originating from the first four contexts are read from an input buffer/working store. This is shown as data blocks A1, B1, C1 and D1 being input at times t1 to t4. Simultaneously with block A1 input to the encryption circuit, key KA is retrieved from a key store and input to the encryption circuit. Similarly, simultaneously with block B1 input to the encryption circuit, key KB is retrieved from a key store and input to the encryption circuit; and so forth.

In the particular case of a CBC mode, a "seed" data block value (or "initial vector") can be combined with the initial data block of a sequence prior to being applied to the encryption pipeline. Such an operation may be accomplished with a multiplexer or the like. Initial vectors are shown as IVA to IVD in FIG. 4A.

Once four values are read into an encryption pipeline, corresponding second data blocks must be read in a predetermined order to ensure proper feedback-type encryption. Because more data blocks are present in the sequences corresponding to contexts 400-1 to 400-4, data blocks A2, B2, C2 and D2 are input at times t5 to t8. At the same time, encrypted data values $E_{KA}$[A1,IVA], $E_{KB}$[B1,IVB], $E_{KC}$[C1, IVC] and $E_{KD}$[D1,IVD] are provided as output values and, internal to the encryption circuit, as feedback values for combination with data blocks A2, B2, C2 and D2, respectively.

A scheduler 106 can be programmed to provide appropriate priority to ensure feedback-type encryption operations. In particular, the active contexts can be stored, and on consecutive cycles, priority can be shifted to give the desired context priority. As shown in FIG. 4A, at time t14, priority can be shifted to give data block E1 priority. Further, one skilled in the art would recognize that the feedback loop in an encryption circuit would be disabled on this cycle to prevent the $E_{KB}$[B3] value from being combined with the E1 value.

In an alternate embodiment, a system may include as many contexts as there are pipeline stages. Each context can be accessed sequentially. In the event a context does not include a data block, a read from the input buffer and write to the output buffer can be suppressed.

In this way, an encryption system can provide an encrypted data block in each system cycle for feedback-type encryption. This is in contrast to a conventional approach that may supply a first data block of a sequence to an encryption circuit and then supply the second block a predetermined time later, limited by the latency of the encryption process on the first data block. Thus, the present invention can process a data block on each system cycle (provided sufficient contexts are active) even when the encryption function includes a feedback loop.

While the above description has described the particularly useful application of the invention to encryption, the described embodiments could also be utilized in other computations, such as modular exponentiation, as but one example. As one very particular example, if the method described in the background above is employed to compute $y=(A^e) \bmod n$, a modular multiply computation circuit (in place of the encryption circuit 102) could provide the $yy=(yy*aa) \bmod n$ operation and/or the $aa=(aa*aa) \bmod n$ operation. Of course, the scheduler operation could be adjusted to ensure that the $yy=(yy*aa) \bmod n$ operation is performed only for iterations corresponding to an "e" bit value equal to one.

Various other methods for computing modular exponentiation could be employed, including Montgomery's method and Barrett's algorithm, to name but two examples.

Modular exponentiation can be particularly useful in public key algorithms such as "Diffie-Hellman" and RSA, to name but two examples. However, one skilled in the art would recognize that modular exponentiation represents but one of many other possible computations that could be performed with high throughput, multi-context pipelining according to the present invention.

Figure 5:
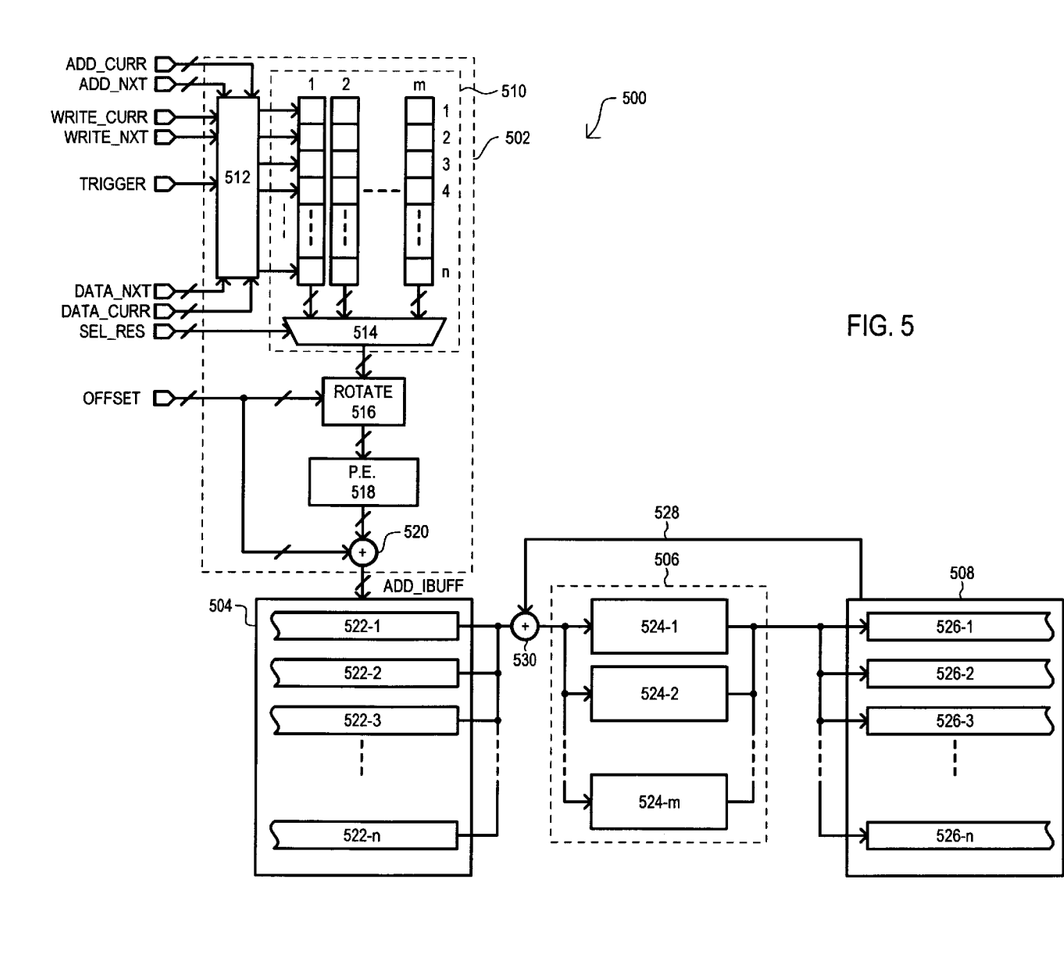
FIG. 5 is a block diagram of a second embodiment.

Referring now to FIG. 5, a second embodiment is set forth in a block diagram. The second embodiment is designated by the general reference character 500 and is shown to include a scheduling section 502, an input buffer/working store 504, an encryption section 506 and an output buffer 508.

A scheduling section 502 can include a register array 510 having n rows and m columns. The variable n can be the number of contexts in an input buffer/working store 504. As but one example, n rows can correspond to n FIFO pipelines storing data blocks for encryption. The variable m can be the number of parallel encryption circuits within encryption section 506, where each encryption circuit is capable of processing one data block per m cycles, such that encryption section 506 can process in aggregate one data block per cycle.

The various rows of the register array 510 can be loaded on a row-by-row basis by operation of load circuit 512. The load circuit 512 may load a row of the register array 510 according to a current address (ADD_CURR) and current data (DATA_CURR) or alternatively, according to a next address (ADD_NXT) and next data (DATA_NXT).

In the particular arrangement of FIG. 5, each row of register array 510 can include m bits, and either all bits will be "0," or one or more bit will be a "1." If row i stores 0s, this can indicate that context i in input buffer/working store 504 does not hold valid data that is ready to be launched into the encryption pipeline. This may be because context i is idle with no data to encrypt, or because a data block for context i is "in flight" in one of the encryption pipelines and its feedback information is not yet available to start the next data block for context i. If the bit in column j of row i stores a 1, the 1 value designates that context i is ready to launch a data block into a encryption pipeline j.

Note that more than one bit in a row i may be set to "1" at the same time. This state would indicate that the next data block to be encrypted for context i can be encrypted by any of several encryption pipelines. If all m encryption pipelines in 506 are the same, then in general all bits in a row would be set to "1" at the same time. On the other hand if the encryption circuits 524-1, 524-2, . . . , 524-m implement heterogenous functions, then the group of bits set to "1" simultaneously in a particular row will correspond to the subset of the m pipelines that implement the function required by the context in question. As one skilled in the art would recognize, any of the m pipelines might also retain state from one data block to the next. In this scenario a context would need to continue using the same encryption pipeline for all data blocks in a sequence of blocks for which state information is kept. Then the context in question, when ready to launch a data block, would activate only the "1" bit for the encryption pipeline holding the associated state.

As shown in FIG. 5, each column of the register array 510 can be applied in parallel to a multiplexer 514. Each particular set of column bits can be conceptualized as a list of all current context "requests" for a particular resource (a particular encryption circuit in this case). One set of column bits is selected by a selection value (SEL_RES). The SEL_RES values can correspond to an available encryption pipeline. The selected column of n bits includes one bit for each context, indicating whether or not that context is ready to use the selected resource on this clock cycle.

A selected column of bits can then be applied to a rotate circuit 516. A rotate circuit 516 may also receive an offset value OFFSET. The rotate circuit 516 can rotate the n-bit vector that represents the selected column. The rotate operation selects which context will be considered highest-priority.

The output of rotate circuit 516 can be provided to a priority encoder 518. The priority encoder 518 can examine its n-bit rotated input and select the lowest-numbered (or highest-numbered) "1" bit from its input, ignoring the "0" bits in its input. The encoded value is then added, in adder 520, to the original offset value to generate an input buffer address ADD_IBUFF.

The input buffer/working store 504 can include the same general constituents and variations as input buffer/working store 104 of FIG. 1. Input buffer/working store 504 includes diagrammatic representations of input contexts 522-1 to 522-n which can correspond to the rows of register array 510.

The encryption section 506 is shown to include encryption circuits 524-1 to 524-m, which can correspond to the columns of register array 510. Each encryption circuit (524-1 to 524-m) can provide the same type of encryption, or alternatively, one or more encryption circuits (524-1 to 524-m) can provide a different type of encryption or other pipelined operation on its input data block. In this way, even higher throughput and/or different encryption or processing streams can be provided.

The output buffer 508 can include output contexts 526-1 to 526-n, which can correspond to input contexts 522-1 to 522-n. Thus, a data block originating from input context 522-1 can be stored as an encrypted data block in output context 526-1, and so on for each context.

In this way the encryption of data blocks from multiple contexts can be distributed in a pipelined fashion across multiple encryption circuits. Scheduling, such as that described in conjunction with FIGS. 4A and 4B can be used to accomplish pipelined feedback-type encryption operations. One particular feedback structure is set forth in FIG. 5. A feedback bus 528 can couple output buffer 508 data to a combining circuit 530 (in this particular example an XOR circuit). In the case of a feedback-type algorithm, a read operation can be performed on the output buffer 508. The read data (which can be a previously encrypted data block) can then be combined with an "incoming" data block in combining circuit 530.

The load circuit 512 can have two functions. First, when a previously idle context becomes active and has data that it wishes to encrypt, a circuit external to encryption system 500 will write a row of bits for that context into the scheduler 510 using the ADD_CURR and DATA_CURR inputs to load circuit 512. Additionally a WRITE_CURR signal will be activated to instruct the load circuit to load the DATA_CURR bits into the row specified by ADD_CURR. When an active context launches a data block into an encryption circuit, all the bits in its scheduler row will be reset to "0" during the period that the data block is "in flight." Once the encryption of the data block is complete then one or more bits of the row are set to "1". This may be accomplished by writing to the load circuit 512, at the time of launching a data block into an encryption circuit, the vector of bits that is to be loaded to the context's row after the data block has completed. The vector of bits is written to the DATA_NXT input and the context number is applied to the ADD_NXT port. When the load circuit 512 receives a signal WRITE_NXT, it can reset the bits of context number ADD_NXT to zero, and store in a holding register for that context the bits applied on DATA_NXT. Later, when the data block for that context has completed, the encryption pipeline can drive the context number of the completed block on a TRIGGER input to load circuit 512, instructing the load circuit to move the vector from the holding register to the scheduler row. In one particular arrangement, a TRIGGER input can be activated in synchronism with a system clock signal.

It is understood that while particular types of encryption pipelines have been described (i.e., various DES modes) other types of computation stages could be employed. The present invention may be particularly advantageous when utilized with "feedback" type computations (i.e., computations that perform an operation on a previously calculated result and a value being input into the computation stage). Among the many possible computations are the Secure Hash Algorithm (SHA) and Message Digest 5 (MD5).

Thus, it is thus understood that while the preferred embodiments set forth herein have been described in detail, the present invention could be subject various changes, substitutions, and alterations without departing from the spirit and scope of the invention. Accordingly, the present invention is intended to be limited only as defined by the appended claims.

What is claimed is:

1. A system, comprising:
   a computation section including at least one computation circuit, each computation circuit processing data blocks and providing processed data blocks;

an input buffer having a plurality of storage locations arranged into multiple contexts, each context including one or more data blocks and being coupled to the computation section; and a scheduler that includes a storage array having at least one row corresponding to each context and at least one column corresponding to each computation circuit, the scheduler being configured to schedule blocks of data from multiple contexts to be simultaneously processed by the computation circuit.

2. The system of claim 1, wherein:

the at least one computation circuit includes a plurality of pipelined computation stages.

3. The system of claim 2, further including:

a logic circuit that combines a previously processed value with a data block.

4. The system of claim 3, wherein:

the computation section includes a plurality of pipelined encryption circuits coupled in parallel to the input buffer.

5. The system of claim 4, wherein:

the computation section provides one or more data encryption standard (DES) round function(s).

6. The system of claim 4, wherein:

each pipelined encryption circuit provides a different encryption function.

7. The system of claim 1, wherein:

the scheduler includes a priority encoder coupled to at least one column of the storage array.

8. The system of claim 7, wherein:

the scheduler further includes a rotate circuit coupled between the at least one column and the priority encoder for changing the priority of the priority encoder.

9. The system of claim 8, wherein:

the scheduler further includes an adder circuit coupled to the rotate circuit, the rotate circuit rotating a value according to an offset value and the adder circuit adding the encoded value from the priority encoder and the offset value.

10. The system of claim 1, wherein:

the computation section includes a plurality of pipelined encryption circuits; and the scheduler includes the storage array having a plurality of rows and columns, and a multiplexer coupled between each column and the priority encoder.

11. The system of claim 1, further including:

an output buffer having a plurality of storage locations arranged into multiple output contexts, each output context being coupled to the computation section and corresponding to the context.

12. A system, comprising:

a computation circuit having a plurality of cipher stages arranged in series;

an input buffer that includes a number of storage circuits arranged into a plurality of contexts, each context including one or more blocks of data; and a scheduler that designates a next block of data from a particular context to input to the computation circuit according to priority criteria that schedules blocks of data from multiple contexts to be simultaneously processed by the computation circuit.

13. The system of claim 12, wherein:

the scheduler priority criteria is selectable.

14. The system of claim 12, wherein:

the scheduler includes a plurality of scheduler storage locations, each scheduler storage location corresponding to a context and having a first value when the next block of data from the particular context is eligible to be input to the computation circuit, and a priority circuit that selects one storage location from all storage locations having the first value.

15. The system of claim 12, wherein:

the at least one computation circuit includes a plurality of pipelined encryption circuits; and the scheduler includes a plurality of scheduler storage locations arranged into an array having rows and columns, each row corresponding to a context and each column corresponding to a particular pipelined encryption circuit, the scheduler storage location having a first value to designate a context of the corresponding row with a pipelined encryption circuit of the corresponding column, a selection circuit that selects a column, and a priority circuit that selects one storage location from the selected column from all storage locations of the column having the first value.

16. The system of claim 15, wherein:

each pipelined encryption circuit provides one or more DES encryption round(s).

17. The system of claim 12, wherein:

each context corresponds to the data of a different network packet.

18. A system for processing data blocks from a plurality of different sources, comprising:

a plurality of data sources arranged into a plurality of contexts, the data source of each context being accessed by a storage address and being coupled to an output data bus;

a computation circuit having a plurality of stages arranged in series; and a scheduler circuit that includes at least one column of schedule stores, each schedule store corresponding to a context and storing a value indicating whether the corresponding context contains a data block that is ready to be input to the computation circuit, and a priority encoder for selecting a schedule store from all schedule stores in which the value indicates the data block is ready to be input to the computation circuit, the scheduler scheduling blocks of data from multiple contexts to be simultaneously processed by the computation circuit.

19. The system of claim 18, wherein each schedule store stores a value in response to an active load signal, and wherein the scheduler circuit further includes a load circuit coupled to each schedule store, each load circuit including a write data input for supplying context values to the scheduler circuit and a write control input for enabling the writing of context data into at least one scheduler store.

20. The system of claim 18, wherein:

each load circuit further includes a trigger input for loading previously stored context data into at least one scheduler store.

21. The system of claim 20, wherein:
the load signal is activated in response to a periodic system clock signal.

22. The system of claim 18, wherein:
the computation circuit includes a plurality of encryption circuits, at least two encryption circuits providing different encryption functions; and
the scheduler circuit includes at least one first type of scheduler store that corresponds to at least one encryption circuit having a first encryption function and at least one second type of scheduler store that corresponds to at least one encryption circuit having a second type of encryption function.

* * * * *